Oct. 29, 1963 F. J. WITT 3,109,147

NONRECIPROCAL WAVE TRANSLATING NETWORK

Filed Oct. 30, 1959 4 Sheets-Sheet 1

INVENTOR
F. J. WITT
BY Sylvan Sherman
ATTORNEY

Oct. 29, 1963 F. J. WITT 3,109,147

NONRECIPROCAL WAVE TRANSLATING NETWORK

Filed Oct. 30, 1959 4 Sheets-Sheet 2

INVENTOR
F. J. WITT

BY
Sylvan Sherman
ATTORNEY

INVENTOR
F. J. WITT
BY
Sylvan Sherman
ATTORNEY

NONRECIPROCAL WAVE TRANSLATING NETWORK

Filed Oct. 30, 1959 4 Sheets-Sheet 4

INVENTOR
F. J. WITT
BY Sylvan Sherman
ATTORNEY

United States Patent Office 3,109,147 Patented Oct. 29, 1963

3,109,147
NONRECIPROCAL WAVE TRANSLATING NETWORK

Francis J. Witt, Summit, N.J., assignor to Bell Telephone Laboratories, Incorporated, New York, N.Y., a corporation of New York Filed Oct. 30, 1959, Ser. No. 849,822
5 Claims. (Cl. 330—12)

This invention relates to nonreciprocal signal translating networks and in particular to gyrators.

A gyrator may be defined as a four-terminal element in which the following relationships exist (see FIG. 1):

$$I_1 = -Y_1 E_2$$

$$I_2 = Y_2 E_1$$

Since the coefficients of the voltage terms are of opposite sign and in general are unequal, the gyrator violates the principle of reciprocity. This is in marked contrast to networks composed of the usual electrical elements such as resistors, capacitors, inductors and transformers, in that such elements, individually, and in combination, satisfy the reciprocity theorem.

In simple terms, the reciprocity theorem states that if a voltage source is inserted at one point in a network, and if the current produced thereby at some other part of the network is measured, the ratio of the measured current to the applied voltage, called the transfer admittance, will be the same if the relative positions of the driving source and the measured effect are reversed.

In the gyrator, however, the transfer admittance for one direction of propagation differs in sign from that for propagation in the reverse direction. In addition, the magnitudes of the transfer admittances for the two directions of propagation are, in general, unequal.

One very important application of the gyrator is as an impedance inverter, i.e., if impedance Z is connected between one pair of terminals of the gyrator, the impedance measured at the other terminals is proportional to 1/Z. Thus, a capacitor of capacitance C may be made to appear as an inductor whose inductance is proportional to C.

Network synthesis, in the past, has been based upon the existence of four basic circuit elements, the capacitor, the resistor, the inductor and the ideal transformer. It is apparent that the introduction of a fifth circuit element, such as a gyrator, leads to considerably improved solutions for many network problems.

Gyrators have been realized, in the past, by means of mechanically coupled piezoelectric and electromagnetic translators, by means of electromagnetic coupling through Hall effect materials, and most recently, by means of electromagnetic coupling to gyromagnetic materials at microwave frequencies.

It is an object of this invention to produce gyrator action at frequencies at which lumped parameter circuit components are used.

It is a further object of this invention that such gyrator networks be broad-band, stable and simple in construction and operation.

In the copending application filed jointly on behalf of applicant and J. M. Sipress (Case 3-3), Serial No. 849,818, filed Oct. 30, 1959, now United States Patent No. 3,001,157, issued Sept. 19, 1961, there is shown a class of gyrator circuits which are derived from one form of the short-circuit admittance matrix representation of the ideal gyrator. Gyrator action in accordance with the present invention, however, is produced by means of a circuit configuration which is based upon an alternative model of the short-circuit admittance matrix. In accordance with the invention, gyrator action is produced by means of a combination of active and passive circuit components. In particular, the circuit comprises a four-terminal network having a pair of input and a pair of output terminals. A series admittance and a voltage source are serially connected across the input pair of terminals and a current source is connected from one of the input terminals to one of the output terminals. Gyrator effects are produced when the output of the voltage source is proportional to the voltage between the network output terminals and the output of the current source is proportional to the voltage across the input terminals.

Although the gyrator network described above may be realized using vacuum tubes, transistors or other similar active elements, a transistorized embodiment of the invention is shown.

The designations "input" and "output" as used herein in referring to the network terminals are understood to be relative terms used solely for the purposes of explanation since the gyrator may be driven at either pair of terminals and output means connected across the remaining pair of terminals.

It is a feature of the present invention that the circuit, while using fewer active elements may, nevertheless, be made to more nearly approximate the ideal gyrator than the circuits in the above mentioned copending application.

It is a further feature of the invention that gyrator action is achieved through the use of a special circuit configuration rather than as a result of the particular adjustment of one or more parameters of the circuit. In many of the prior art networks, the operation of the circuit as a gyrator is directly a function of the specially adjusted parameters and as a result the circuit is quite sensitive to variations in environment and aging of the particular elements of which the given parameters are descriptive.

The performance of a gyrator in accordance with the invention, on the other hand, is substantially independent of variations in the parameters of the active circuit elements. Consequently, the accuracy of the gyrator action is relatively insensitive to changes in the active circuit components, or variations in environment such as temperature, line voltage, etc.

These and other objects and advantages, the nature of the present invention, and its various features, will appear more fully upon consideration of the various illustrative embodiments now to be described in detail in connection with the accompanying drawings, in which:

FIG. 1 is an equivalent circuit of a gyrator;

FIGS. 2, 3, 4, and 5 show, by way of illustration, successive steps in the derivation of a modified equivalent circuit;

Figure 1:
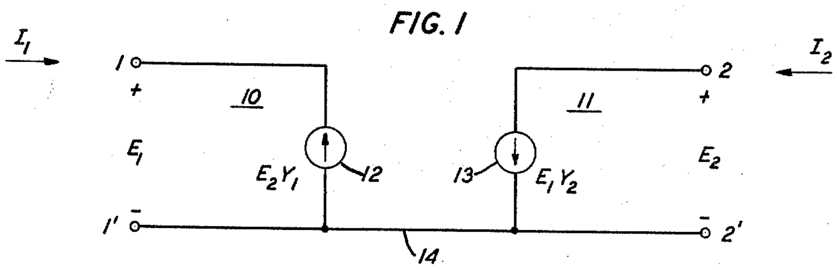

Referring more specifically to FIG. 1, there is shown an equivalent circuit diagram of an ideal gyrator of the type implemented in the above-mentioned copending application. The circuit comprises the two meshes 10 and 11, each of which has zero self-admittance. Coupling between the two meshes is provided by means of the mutual admittances $-Y_1$ and $Y_2$. Specifically, the coupling is in the form of an induced current in each of the meshes which is proportional to the voltage at the terminals of the other of the meshes. The induced currents $-E_2Y_1$ and $E_1Y_2$ are represented by the current generators 12 and 13, respectively. The terminal 1' of mesh 10 and terminal 2' of mesh 11 are connected together by means of a lead 14 to form a common junction, or reference point.

To more fully and readily understand the gyrator circuit, in accordance wth the invention, the equivalent circuit of FIG. 1 is modified in the manner to be described hereinafter.

Figure 2:
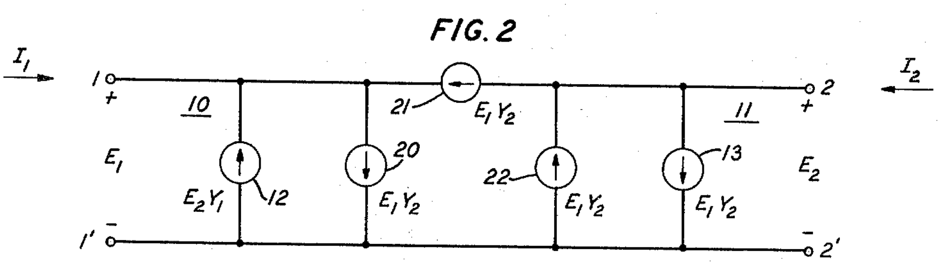

In FIG. 2 there is shown the basic circuit of FIG. 1 to which there has been added the three current generators 20, 21 and 22. The currents produced by the three generators are equal and are introduced into the circuit so as to produce no net change at the circuit terminals. That is, the mesh currents $I_1$ and $I_2$ are unaffected by the presence of the added generators.

Figure 3:
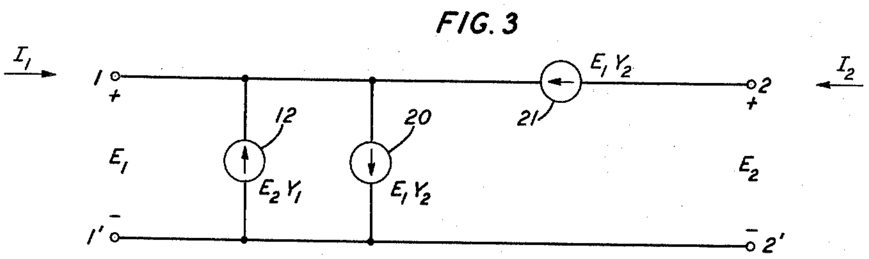

In FIG. 3 the circuit is simplified by recognizing that the current generators 13 and 22, being of equal amplitude and opposite polarity, may be eliminated from the network.

Figure 4:
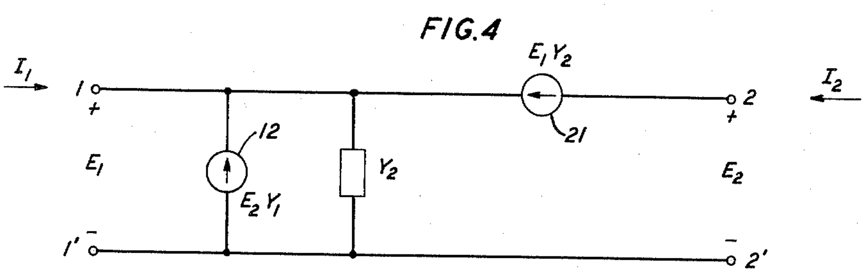

The circuit may be further simplified by replacing the current generator 20 by the simple admittance $Y_2$, which, having the voltage $E_1$ impressed across it produces the current $E_1Y_2$, as before. This change is indicated in FIG. 4.

Figure 5:
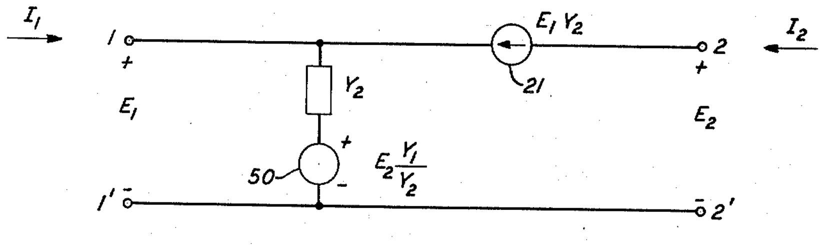

By the application of Thevenin's Theorem, the current generator 12 and the parallel admittance $Y_2$ may be replaced by the voltage generator 50, of voltage $(Y_1/Y_2)E_2$ and the series admittance $Y_2$, as shown in FIG. 5. For the special case in which $Y_1=Y_2=Y$, the circuit may be further simplified as shown in FIG. 6.

Figure 6:
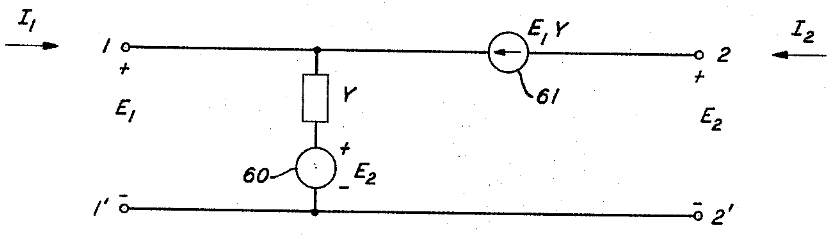
FIG. 6 is a modified equivalent circuit of a gyrator.

In accordance with the circut of FIG. 6, it is seen that gyrator action is produced by connecting a voltage generator 60 in series with an admittance Y across one pair of terminals 1—1', and by connecting a current generator 61 between the terminals 1 and 2. Specifically, the amplitude of the voltage produced by the voltage generator 60 is equal to the voltage $E_2$ across the terminals 2—2', whereas the current $E_1Y$ produced by the current generator 61 is equal to the product of the voltage across terminals 1—1' and the series admittance Y. The voltage polarity and current directions are as indicated.

That the circuit of FIG. 6 performs as a gyrator may be demonstrated by applying a voltage $E_1$ across terminals 1—1' and shorting terminals 2—2'. Under these conditions, a short-circuit current $I_2=E_1Y$ will flow. The transfer admittance is then $I_2/E_1=Y$. In the reverse direction, a voltage $E_2$ applied across terminals 2—2' will cause a short-circuit current $I_1=-E_2Y$ to flow between terminals 1—1'. The transfer admittance in the reverse direction is then $I_1/E_2=-Y$. In addition, the short-circuit self-admittance of each mesh is zero.

To realize an ideal gyrator, in accordance with the invention, two idealized circuit components are postulated. These are a voltage amplifier and a current amplifier.

Figure 7A:
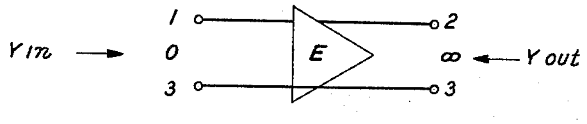
FIGS. 7A and 7B show, by way of illustration, an ideal voltage amplifier and a transistor equivalent circuit.

The ideal voltage amplifier, as contemplated by the invention, is shown symbolically in FIG. 7A. It has zero input admittance, infinite output admittance, a finite positive voltage gain $k$ in the forward direction, and zero current gain in the reverse direction. The ideal current amplifier, shown symbolically in FIG. 8A, has infinite input admittance, zero output admittance, a finite positive current gain K in the forward direction, and zero voltage gain in the reverse direction.

Both of these circuit components may be approximated, in general, by using any of the well known active circuit elements or combinations thereof. Because of the many advantages enjoyed by transistors, however, the embodiment of the present invention will be illustrated using transistors as the active circuit elements.

The transistor may be regarded as a device whose collector and emitter currents are substantially equal, whose base current is zero (negligible with respect to the emitter or collector current), and whose emitter-to-base voltage is also negligibly small. To the extent that the transistor characteristics depart from these assumptions, the resulting amplifier circuits will depart from the postulated ideal.

Figure 7B:
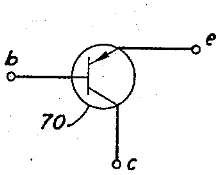

Based upon the above-enumerated characteristics of the transistor, the voltage amplifier of FIG. 7A can be realized by the common collector connection of the transistor shown in FIG. 7B. This equivalence is obtained by connecting the input between the base $b$ and the collector $c$ of transistor 70, and taking the output between the emitter $e$ and the collector $c$.

Figure 8A:
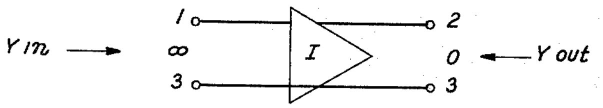
FIGS. 8A and 8B show, by way of illustration, an ideal current amplifier and a transistor equivalent circuit.
Figure 8B:
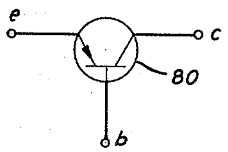

The current amplifier of FIG. 8A can be realized, as indicated in FIG. 8B, by means of the common base transistor connection. In this configuration, the input is applied between the emitter $e$ and base $b$ of transistor 80, and the output is taken between the collector $c$ and base $b$.

It should be noted, however, that the voltage gain $k$ of the transistor voltage amplifier of FIG. 7B and the current gain K of the transistor current amplifier of FIG. 8B are both equal to unity.

One additional circuit element should be briefly considered. It is the voltage-to-current transducer shown symbolically in FIG. 9A. The transducer has a finite short-circuit input and output admittance, and can be readily realized by means of a simple series admittance Y, as shown in FIG. 9B. A voltage E applied to one of the ports produces a short-circuit current I equal to EY at the other port, as indicated in FIG. 9B.

The gyrator may now be realized using the above-described circuit components. This is most conveniently done by considering the two aforementioned portions separately. The first portion comprises a voltage source and an admittance in series across terminals 1—1', with the voltage source proportional to the voltage across terminals 2—2'. Such an arrangement is shown in FIG. 10, wherein admittance Y is in series with the output of the voltage amplifier 100, whose input is connected between terminals 2—2'.

Figure 9A:
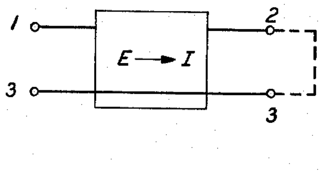
FIGS. 9A and 9B show, by way of illustration, a voltage-to-current transducer and a network equivalent.
Figure 9B:
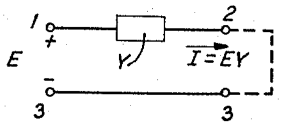
Figure 10:
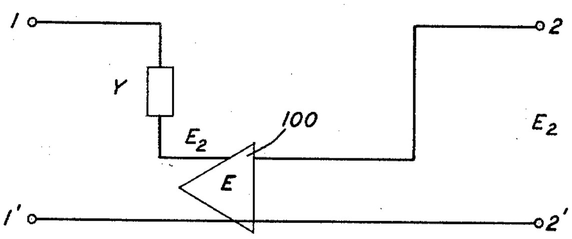
FIGS. 10 and 11 show, in block diagram, a portion of the gyrator circuit in accordance with the invention.

The circuit of FIG. 10 may be further generalized by noting that the series admittance Y is essentially a voltage-to-current transducer of the type illustrated in FIG. 9B and shown symbolically in FIG. 9A. Accordingly, in FIG. 11, this portion of the gyrator circuit is shown with the admittance Y replaced by its functional counterpart, the voltage-to-current transducer 110, which, in general, may have short-circuit self-admittances that are not equal to either its short-circuit transfer admittance, or to each other.

Figure 12:
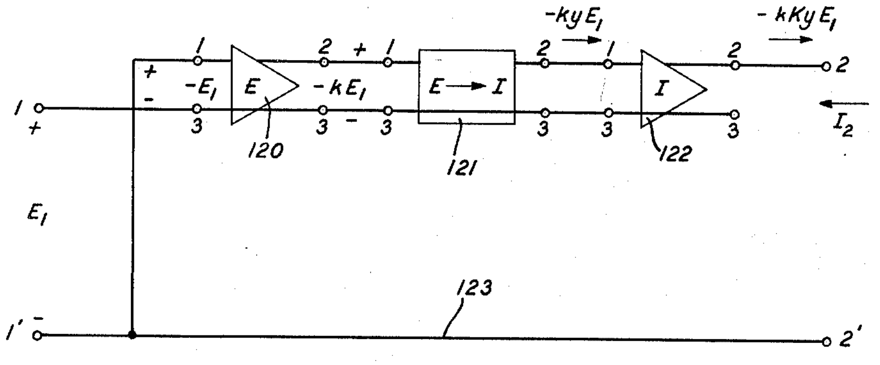
FIG. 12 shows, in block diagram, a second portion of the gyrator circuit in accordance with the invention.

The second portion of the gyrator circuit comprises a current source connected between terminals 1 and 2 whose output is proportional to the voltage between terminals 1—1'. A circuit to simulate such a current source is shown in FIG. 12. It comprises, in cascade, the voltage amplifier 120, the voltage-to-current transducer 121, and the current amplifier 122. Gyrator input terminals 1—1' are connected between terminals 3 and 1, respectively, of voltage amplifier 120. Gyrator output terminal 2 is connected to terminal 2 of the current amplifier 122, and gyrator output terminal 2' is connected to input terminal 1' by conductor 123, to form a common junction.

It is the function of the circuit shown in FIG. 12 to produce a current $I_2$ equal to $E_1Y$ at gyrator terminal 2 in response to a voltage $E_1$ applied between gyrator terminals 1—1'.

In operation, a voltage $E_1$ applied between terminals 1—1' is impressed between input terminals 1 and 3 of the voltage amplifier 120. It should be noted, however, that as connected there is an effective phase reversal of the applied voltage. That is, the applied voltage $E_1$ appears as $-E_1$ across terminals 1—3 of amplifier 120. The output of amplifier 120, $-kE_1$, is impressed upon the voltage-to-current transducer 121 to produce a current $-kyE_1$, which is, in turn, applied to the current amplifier 122. The output of the current amplifier, $-kKyE_1$, is equal to $-I_2$. That is, $I_2=kKyE_1$. Since, at any frequency, $kKy$ is a constant, $I_2$ is proportional to $E_1$, as required.

Figure 11:
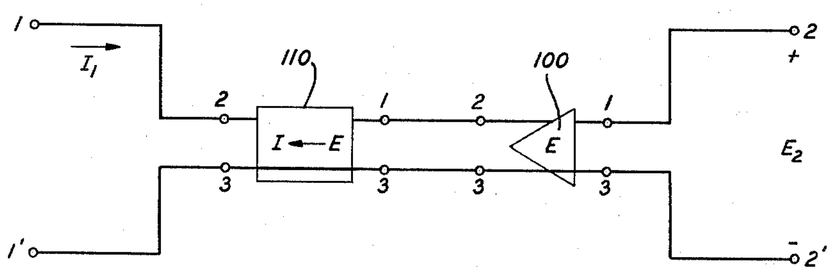
Figure 13:
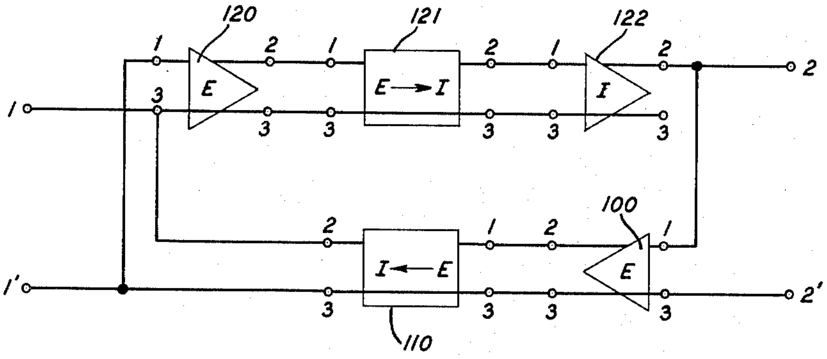
FIG. 13 shows, in block diagram, the complete gyrator circuit in accordance with the invention.

The complete gyrator network is obtained by simply connecting the two circuit portions of FIG. 11 and FIG. 12 in parallel. The combined circuit is shown in FIG. 13 wherein the numerical designations of FIGS. 11 and 12 have been retained to facilitate the identification of the various components.

As has been previously stated, it is a property of an ideal gyrator that both its short-circuit self-admittances are zero. An examination of FIG. 13, however, discloses that the gyrator there shown does not necessarily satisfy this requirement, for while the short-circuit self-admittance at terminals 2—2′ is substantially zero, this is not necessarily the case at terminals 1—1′. Specifically, if terminals 2—2′ are shorted, and a voltage is applied between terminals 1—1′, it is evident that a current will flow whose amplitude is a function of the admittance between terminals 2 and 3 of the voltage-to-current transducer 110. It can be shown, however, that this current may be made equal to zero, and consequently the self-admittance between terminals 1—1′ made equal to zero, if the self-admittance, $Y_3$, measured between terminals 2 and 3 of transducer 110 satisfies the following relationship:

$$Y_3=kKy$$

where $k$ is the voltage gain of amplifier 120
$K$ is the current gain of amplifier 122, and
$y$ is the transfer admittance of transducer 121.

Figure 14:
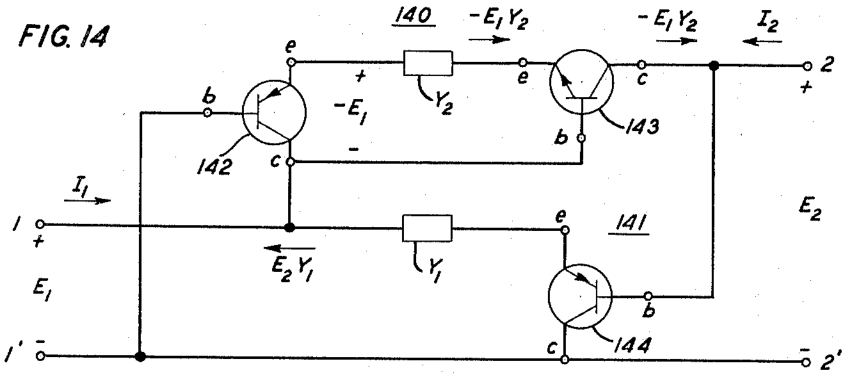
FIGS. 14 and 15 are a transistorized embodiment of the gyrator circuit of FIG. 6.

In FIG. 14, the transistorized version of the gyrator of FIG. 13 is shown. It comprises the two suitably connected signal paths 140 and 141. Path 140 includes transistor 142 which, connected in the common collector configuration, corresponds to voltage amplifier 120 of FIG. 13; series admittance $Y_2$ which corresponds to the voltage-to-current transducer 121; and transistor 143 connected in the common base configuration which corresponds to the current amplifier 122.

Signal path 141 comprises transistor 144 connected in the common collector arrangement to function as the voltage amplifier 100, and the series admittance $Y_1$, which corresponds to the voltage-to-current transducer 110.

In operation, and with terminals 2—2′ shorted, a signal voltage $E_1$, impressed between terminals 1—1′, appears as a voltage $-E_1$ between the base $b$ and collector $c$ of transistor 142. Since the base-to-emitter voltage in both transistors 142 and 143 are negligibly small, voltage $-E_1$ is effectively across admittance $Y_2$ producing current $-E_1Y_2$. Also, since the base current of transistors 143 and 144 are negligible, substantially all of current $-E_1Y_2$ entering the emitter of transistor 143 leaves the collector of transistor 143 to produce the short-circuit current $I_2$ equal to $E_1Y_2$. The transfer admittance is, therefore, $I_2/E_1=Y_2$.

As was explained above, the short-circuit self-admittance of the circuit configuration of FIG. 13 would, in general, not be equal to zero. This is also true of the transistor circuit of FIG. 14. However, upon examination, it is seen that with terminals 2—2′ shorted, the combination of circuit components comprising path 140 constitutes a Linvill negative impedance converter which, in effect, places a second admittance equal to $-Y_2$ across terminals 1—1′ and in shunt with admittance $Y_1$. (See "Transistor Negative Impedance Converters" by J. G. Linvill, Proceedings of the Institute of Radio Engineers, 41 (1953), pages 725–729.) In an ideal circuit, that is, one having ideal transistors, the short-circuit self-admittance $Y_{1-1'}$ will be zero by making $Y_2$ equal to $Y_1$. In any practical embodiment of the gyrator, however, the parameters of the active elements, that is, transistors 142, 143, and 144, and also the biasing elements, will affect this balance and for this reason either $Y_1$ or $Y_2$ is sometimes made adjustable.

For transmission in the reverse direction, a voltage $E_2$ is applied between terminals 2—2′. However, with terminals 1—1′ shorted, this voltage will appear across admittance $Y_1$ and produce a short-circuit current $I_1$ equal to $-E_2Y_1$. The transfer admittance in this direction is, therefore, $$I_1/E_2=-Y_1$$

It will also be noted that voltage $E_2$ is applied between the input terminals of a common collector stage (transistor 144) and between the output terminals of a common base stage (transistor 143). The net input current thus produced in response to voltage $E_2$ is negligibly small so that the self-admittance $Y_{2-2'}$ is substantially equal to zero.

Figure 15:
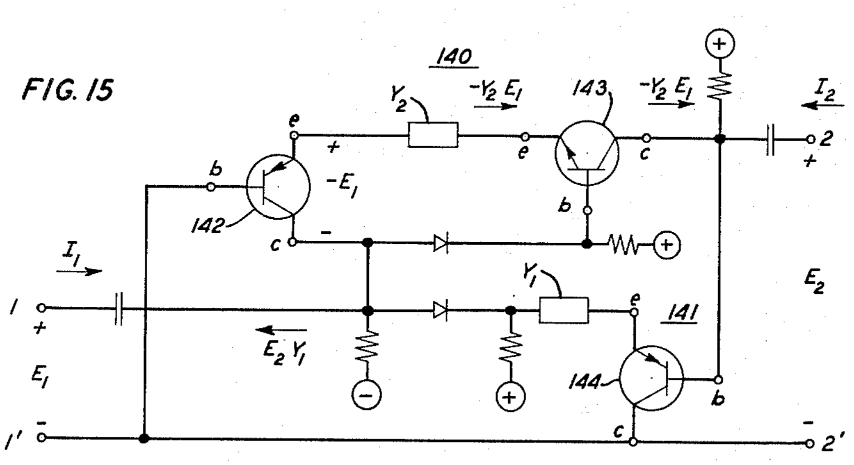

FIG. 15 shows the complete transistorized gyrator circuit. It includes the circuit of FIG. 14 to which there has been added the various resistors, diodes and capacitors and their direct current power sources for establishing the necessary operating biases in the several transistors. These are shown, but not otherwise identified.

In the illustrative embodiment of the invention shown in FIGS. 14 and 15, both n-p-n and p-n-p type transistors were used. The intermingling of both types of transistors within one network was merely an expedient for simplifying the biasing arrangements. Obviously, by making the appropriate changes in the biasing circuits, one or the other of the two types of transistors could be used exclusively.

In all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A four-terminal network having a pair of input and a pair of output terminals, said network comprising an impedance element and a voltage source serially connected across said pair of input terminals, a current source connected from one of said pair of input terminals to one of said pair of output terminals, said voltage source having an output voltage proportional to the voltage across said output terminals and said current source having an output current proportional to the voltage across said input terminals.

2. A gyrator comprising, in combination, a plurality of transistors each having an emitter, a collector and a base electrode, means for connecting the collector of a first transistor to the base of a second transistor, means for connecting an admittance $Y_2$ between the emitter of said first transistor and the emitter of said second transistor, means for connecting the collector of said second transistor to the base of a third transistor, separate means for connecting a second admittance $Y_1$ between the collector of said first transistor and the emitter of said third transistor, means for connecting the collector of said third transistor to the base of said first transistor, a first external circuit connected between the collector of said first transistor and the collector of said third transistor, a second external circuit connected between the collector of said second transistor and the collector of said third transistor, and means for applying bias to said transistors.

3. A gyrator circuit comprising two four-terminal networks each having a first and second input terminal and a first and second output terminal, said input terminals of said first networks being connected in parallel with said output terminals of said second network to form the input terminals of said circuit, said first output terminal of said first network being connected to said first input terminal of said second network to form one output terminal of said circuit, said second input terminal of said second network being the other output terminal of said circuit, said first network comprising, in cascade, voltage phase inverting means, a voltage amplifier, a voltage-to-current transducer, and a current amplifier, and said second network comprising, in cascade, a voltage amplifier and a voltage-to-current transducer.

4. A gyrator circuit comprising a pair of transmission paths, the first of said paths comprising, in cascade, a first voltage amplifier having first and second input connections and a first voltage-to-current transducer having first and second output connections, said second input connection and said second output connection being connected in common, said second path comprising, in cascade, a second voltage amplifier having first and second input connections, a second voltage-to-current transducer and a current amplifier having first and second output connections, said second output connection of said current amplifier and said second input connection of said second voltage amplifier comprising a second common junction, means for connecting the first output connection of said first transducer to the second input connection of said second voltage amplifier to form a first network terminal, means for connecting the second output connection of said first transducer to the first input connection of said second voltage amplifier to form a second network terminal, said first and said second network terminals being the input terminals of said circuit, means for connecting the first output connection of said current amplifier to the first input connection of said first voltage amplifier to form a third network terminal, the fourth network terminal being said second input connection of said first voltage amplifier, and said third and said fourth network terminals forming the output terminals of said circuit.

5. A nonreciprocal signal translating network comprising two four-terminal circuits, the first of said circuits comprising, in cascade, a voltage amplifier, a voltage-to-current transducer, and a current amplifier, said first circuit having a pair of input terminals and a pair of output terminals, with one of said input terminals and one of said output terminals connected to a first common junction, the second of said circuits comprising, in cascade, a voltage amplifier and a voltage-to-current transducer, said second circuit having a pair of input terminals and a pair of output terminals, with one of said input terminals and one of the output terminals connected to a second common junction, means for connecting the other input terminal of said second circuit to the other output terminal of said first circuit, means for connecting the other output terminal of said second circuit to said first common junction, means for connecting the other input terminal of said first circuit to said second common junction, said first common junction and said second common junction comprising one pair of terminals of said network, and said second common junction and said interconnected other input terminal of said other path with said other output terminal of said one path comprising a second pair of terminals of said network.

References Cited in the file of this patent

UNITED STATES PATENTS

| | | |
|---|---|---|
| 1,894,322 | Nyquist | Jan. 17, 1933 |
| 2,615,090 | Gruen | Oct. 21, 1952 |
| 2,871,376 | Kretzmer | Jan. 27, 1959 |
| 2,923,784 | Flanagan | Feb. 2, 1960 |
| 3,001,157 | Sipress et al. | Sept. 19, 1961 |
| 3,010,085 | Seidel | Nov. 21, 1961 |

OTHER REFERENCES

"The Gyrator as a 3-Terminal Element," by J. Shekel, pages 1014–1016, Proceedings of the I.R.E., August 1953.